(No Model.)
J. L. JENSEN.
CULTIVATOR.
No. 260,686. Patented July 4, 1882.
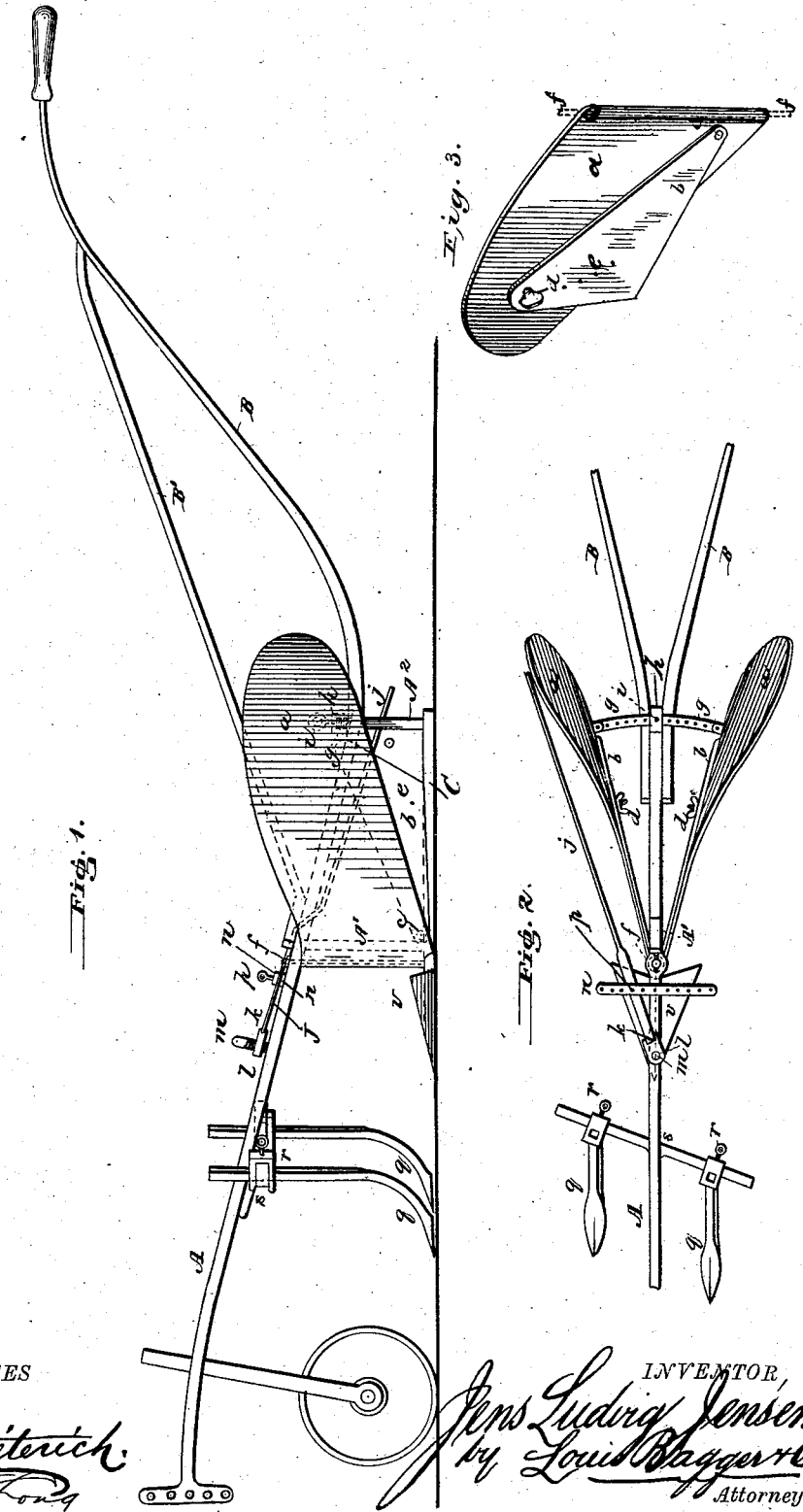
WITNESSES
INVENTOR,

UNITED STATES PATENT OFFICE.

JENS L. JENSEN, OF COPENHAGEN, DENMARK.

CULTIVATOR.

SPECIFICATION forming part of Letters Patent No. 260,686, dated July 4, 1882.

Application filed February 1, 1882. (No model.)

*To all whom it may concern:*

Be it known that I, JENS LUDVIG JENSEN, a subject of the King of Denmark, residing at the city of Copenhagen, in the Kingdom of Denmark, have invented certain new and useful Improvements in Cultivators; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

My invention has relation to that class of so-called "walking-cultivators," for cultivating potatoes and other plants which are grown in "hills," in which the mold-boards are made adjustable upon a fixed vertical pintle and provided with hinged wings or extensions on their inner sides; and it consists in the detailed construction and arrangement of the said hinged wings, and also in the detailed construction and arrangement of the adjustable fender or fender-bar for lifting the leaves of the plants as the machine advances, and thus preventing covering them, substantially as hereinafter more fully described, and particularly pointed out in the claims.

In the accompanying drawings, Figure 1 represents a side elevation of my improved cultivator. Fig. 2 is a plan or top view of the same, and Fig. 3 is a detail view of one of the hinged wings or mold-boards with its auxiliary wing or pivoted extension.

Similar letters of reference indicate corresponding parts in all the figures.

A is the tongue, and B B the handles, which are braced to the tongue by rods B'.

A' and A² are parallel vertical standards, depending from the tongue and connected by the furrow-piece or shoe C, at the forward end of which (in front of standard A') is the arrow-head-shaped plowshare $v$. Back of this share, and connecting it to the tongue, is a long bolt or pintle, $f$, upon which a pair of wings, $a$ $a$, are hinged or pivoted, and each of said wings is provided with an inwardly-projecting curved arm, $g$, which works through a loop or eye, $h$, at the rear end of the tongue. The arms $g$ $g$ are perforated, and may be held in their adjusted position by means of a pin, $i$. It is obvious that the wings $a$ $a$ may be adjusted independent of each other, and placed either at the same or at different angles to the tongue by removing pin $i$ and sliding either of the perforated curved arms $g$ through loop $h$ the required distance, after which the pin is reinserted to hold the arms in their adjusted position.

$b$ $b$ are auxiliary wings, which are pivoted upon bolts or studs $c$ on the inner side of the wings $a$, upon which they may be fixed in their adjusted position by means of set-screws $d$, fastened upon the inner side of the wings $a$ $a$, and screw-threaded holes $e$ in the pivoted wings $b$. By these auxiliary wings it will be seen that the width of the main wings or pivoted mold-boards $a$ $a$ may be increased in front of their flaring rear ends, thus regulating the depth of cut made by said wings on both sides of the pointed share $v$.

$m$ is a screw-threaded tap, upon which is screwed a nut, $l$, in which an iron rod or arm, $j$, is hinged at $k$. This arm extends rearwardly on one side of the plow in an inclined or downward direction, and is held in place adjustably by being placed between two parallel clamping-bars, $n$ $n$, which are secured crosswise upon the tongue, a bolt, $p$, being inserted through registering-holes in bars $n$ $n$ and arm $j$. By withdrawing the bolt or pin $p$ arm $j$ may be shifted from one side of the plow to the other, or it may be adjusted at any desired angle to the central beam or tongue, A. As the plow advances this bar will operate as a fender to lift the leaves of the plants from the ground, and thus prevent covering them, and, also, by bending the stalks sidewise prevent injury to them by the hinged wings $a$.

$q$ and $q$ are a pair of shovels, the standards of which are inserted adjustably through slotted keepers $r$ $r$, sliding upon a cross-bar, $s$, that is secured obliquely upon the tongue. The slotted keepers $r$ may be held in their adjusted position upon the cross-bar, at a greater or less distance from each other, by set-screws, in a manner well understood.

By the lateral adjustment of the hinged wings $a$ $a$ the width of the furrow between the rows or hills may be regulated, while its depth, as well as the bottom width, will depend upon the position of the auxiliary wings $b$ $b$. The object of the adjustable arm $j$, which, as above stated, can be shifted to either side of the tongue and held rigidly in its adjusted position between the perforated cross-bars $n\, n$ by the pin $p$, is to deflect the tops of the plants as the machine advances between the rows to one side, so as to lift the leaves, and thus prevent covering them. The shovels $q\, q$ will effectually break and pulverize the soil in advance and on both sides of the pointed share, thus making it easier for the adjustable side wings, with their auxiliary wings or extensions, to throw up the hill or ridge on both sides of the central furrow.

Having thus described my invention, I claim and desire to secure by Letters Patent of the United States—

1. The combination, with the beam A, having standards $A'$ $A^2$, arrow-head share $v$, having the shoe C connecting it with the rear standard, $A^2$, bolt or pintle $f$, and adjustable wings $a\, a$, of the adjustable auxiliary wings $b\, b$ and means for holding the same in their adjusted position upon wings $a\, a$, substantially as and for the purpose herein shown and set forth.

2. In a cultivator, the combination, with a plow and plow-beam provided with the screw-threaded tap $m$, perforated cross-bars $n\, n$, and pin $p$, of the removable fender-bar $j$, hinged at one end in the nut $l$, and adjustable laterally or to either side in the perforated bars $n\, n$, substantially as and for the purpose herein shown and specified.

In testimony whereof I have hereto affixed my signature in presence of two witnesses.

JENS LUDVIG JENSEN.

Witnesses:
 FREDERIK WOLFF,
 R. F. BEYGREEN.